Patented May 1, 1923.

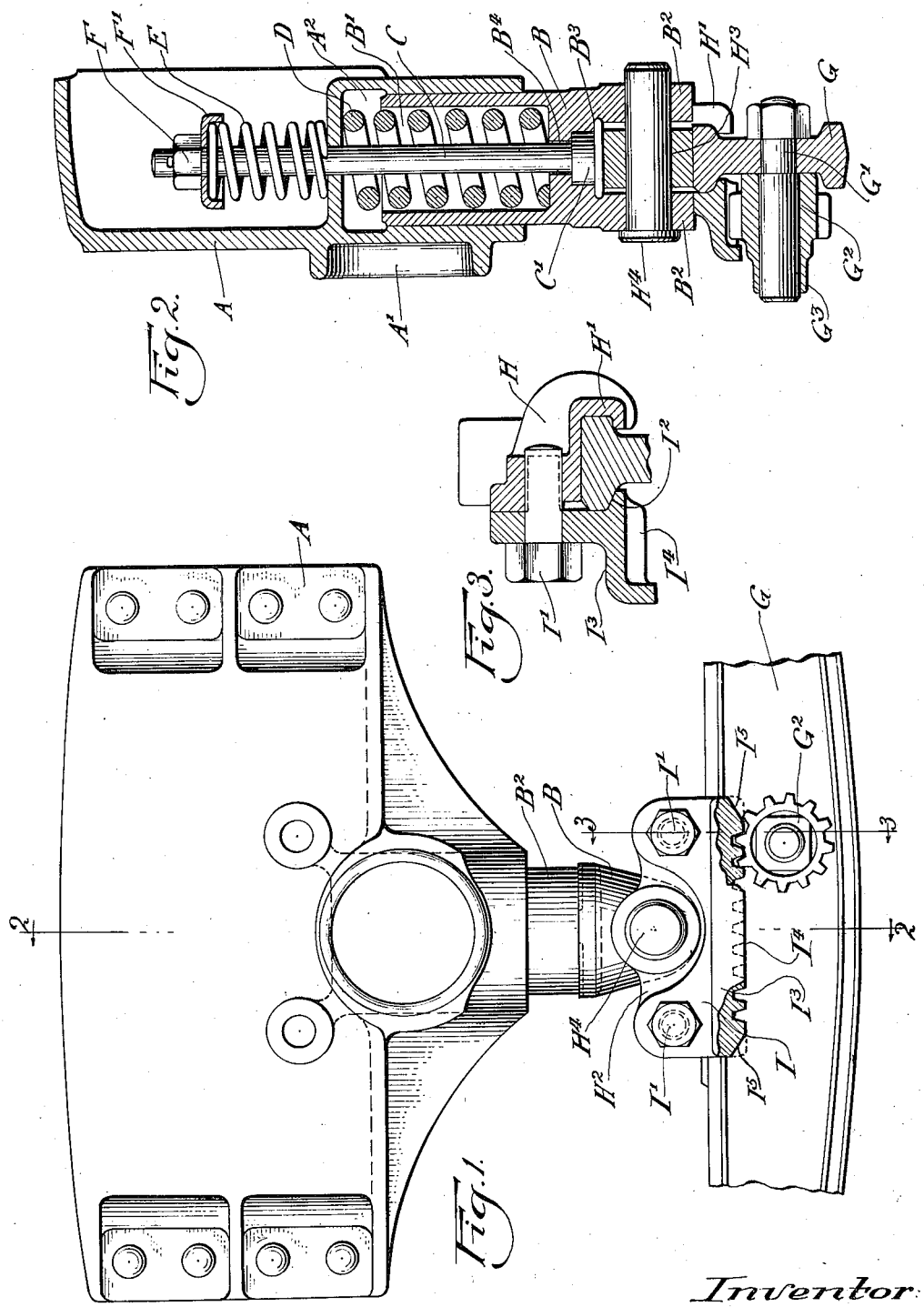

1,453,525

UNITED STATES PATENT OFFICE.

JAMES ROSS, OF LAPORTE, INDIANA, ASSIGNOR TO ADVANCE-RUMELY COMPANY, OF LAPORTE, INDIANA, A CORPORATION OF INDIANA.

ADJUSTABLE FRONT AXLE.

Application filed April 17, 1922. Serial No. 553,721.

*To all whom it may concern:*

Be it known that I, JAMES ROSS, a citizen of the United States, residing at Laporte, in the county of Laporte and State of Indiana, have invented a certain new and useful Improvement in Adjustable Front Axles, of which the following is a specification.

This invention relates to the front axle mounting of a traction engine and has for one object to provide means whereby the engine frame may be moved laterally upon the axle. Other objects will appear from time to time throughout the specification and claims.

My invention is illustrated more or less diagrammatically in the accompanying drawings, wherein:

Figure 1 is a front elevation of the vehicle frame showing the axle in part;

Figure 2 is a vertical cross section on line 2—2 of Figure 1;

Figure 3 is a vertical cross section on line 3—3 of Figure 1.

Like parts are designated by like characters throughout.

A is the front frame member of the vehicle frame. It is provided in its forward side with an open cup shaped depression A'. It is provided in its downward side in line with the cup shaped depression A' with a socket A² within which a plunger B is adapted to be mounted for vertical reciprocation. The plunger is hollow as shown as at B' and is provided in its lower end with the two downwardly projecting ears B² B². Between and slightly above the ears it is provided with a socket B³ above which there is a perforation B⁴. It is normally held in position by means of the bolt C, the shaft which passes through the perforation B⁴ and the member C' which lies within the socket B³.

About the bolt C and lying partially within the socket B' of the plunger B is a helical spring D which bears at one end against the bottom of the socket B' and at the other end against the front frame member. Toward the top of the bolt C is a second helical spring E. At the top of the bolt C is a locking nut F and beneath this is a laterally extending cup F'. The spring E bears at its top end upon the cup F' and at its bottom end upon the front frame member A.

G is the front axle formed generally in the shape of an I as shown. It is perforated as at G' and has mounted upon it a pinion G². Extending forward of this pinion and preferably integral with it is a squared portion G³, over which a suitable tool may be positioned in order to rotate the pinion.

Mounted so as to slide upon the top of the axle G is the front axle slide block H. This block carries a plurality of downwardly depending hooks H' which engage the under side of the upper enlargement of the axle G, as shown preferably in Figures 2 and 3. The axle slide block H is provided with the upward extension H² which is perforated as at H³. About this extension the two ears B² forming the front axle yoke are positioned and they are pivoted at this point by means of the pin H⁴.

Lying along the front of the axle is the axle adjusting rack I. This rack is bolted to the slide block by means of bolts I' I' which may be tightened so as to draw the two firmly together and clamp the upper edge of the axle. For the purpose of adjustment they may be loosened so as to permit the axle slide block to move along the upper edge of the axle. The rack engages on its under side the upper enlargement of the axle G as at I² as particularly shown in Figure 3. It is provided with the lateral enlargement I³ which carries on its under side a rack I⁴ which is in mesh with pinion G². The rack is flattened at either end as at I⁵ as shown in Figure 1 to provide a stop to prevent excessive lateral movement of the slide. When the pinion reaches the point shown in full lines in Figure 1 because of the flattened portion I⁵ on the end of the rack, it cannot move further.

Although I have shown an operative invention, still it will be obvious that many changes in size, shape and relation of parts without departing materially from the spirit of my invention and I wish therefore that my showing be taken as in a sense diagrammatic.

The use and operation of my invention are as follows:

Normally the axle slide block is held in the center of the axle. When, however, it is desired for any reason to alter its relation the clamp bolts are loosened and the slide block and adjusting rack thus no longer grip the upper edge of the axle. Thereupon the slide pinion is rotated and the slide block is moved to the right or left as the case may be. When it has been moved a sufficient distance, the clamp bolts may be tightened again and the parts will remain in fixed position. When it is again desired to change the relative position of the vehicle frame and axle the same operation is repeated.

I claim:

1. In combination with a vehicle frame an axle and means for moving said frame bodily with respect to said axle, said means including a sliding member supported from said axle and carrying one end of the vehicle frame and a pinion mounted for rotation in said axle and adapted to engage said sliding member and when rotated to move the same so as to move the frame laterally.

2. In combination with a vehicle frame an axle and means for moving said frame bodily with respect to said axle, said means including a sliding member supported directly upon said axle and carrying one end of the vehicle frame, and a pinion mounted for rotation in said axle and adapted to engage said sliding member and when rotated to move the same so as to move the frame laterally.

3. In combination with a vehicle frame an axle and means for moving said frame bodily with respect to said axle, said means including a sliding member supported from said axle and carrying one end of the vehicle frame and a pinion mounted for rotation in said axle and adapted to engage said sliding member and when rotated to move the same so as to move the frame laterally, said sliding means including a rack adapted to be engaged by said pinion.

4. In combination with a vehicle frame an axle and means for moving said frame bodily with respect to said axle, said means including a sliding member supported from said axle and carrying one end of the vehicle frame and a pinion mounted for rotation in said axle and adapted to engage said sliding member and when rotated to move the same so as to move the frame laterally, and means for locking said sliding member against movement with relation to the axle.

5. In combination with a vehicle frame an axle and means for moving said frame bodily with respect to said axle, said means including a sliding member supported from said axle and carrying one end of the vehicle frame and a pinion mounted for rotation in said axle and adapted to engage said sliding member and when rotated to move the same so as to move the frame laterally, said sliding means including a rack adapted to be engaged by said pinion and means for locking said sliding member against movement with relation to the axle.

6. In combination with a vehicle frame an axle and means for moving said frame bodily with respect to said axle, said means including a sliding member supported directly upon said axle and carrying one end of the vehicle frame, and a pinion mounted for rotation in said axle and adapted to engage said sliding member and when rotated to move the same so as to move the frame laterally, said sliding means including a rack adapted to be engaged by said pinion, and means for locking said sliding member against movement with relation to the axle.

7. In combination with a vehicle frame an axle and means for moving the frame laterally bodily with relation to the axle including a sliding member upon said axle in combination with a rack member and a pinion mounted in said axle for rotation and in mesh with said rack and adapted by its rotation to move the frame laterally with relation to the axle.

8. In combination with a vehicle frame an axle and means for moving the frame laterally bodily with relation to the axle including a sliding member upon said axle in combination with a rack member and a pinion mounted in said axle for rotation and in mesh with said rack and adapted by its rotation to move the frame laterally with relation to the axle, and means for drawing the sliding member and the rack together to hold the frame against movement with relation to the axle.

9. In combination with a vehicle frame an axle and means for moving the frame laterally bodily with relation to the axle including a sliding member upon said axle in combination with a rack member and a pinion mounted in said axle for rotation and in mesh with said rack and adapted by its rotation to move the frame laterally with relation to the axle, said rack member shaped to provide in itself a stop to limit the lateral movement with relation to the axle.

10. In combination with a vehicle frame an axle and means for moving the frame laterally bodily with relation to the axle including a sliding member upon said axle in combination with a rack member and a pinion mounted in said axle for rotation and in mesh with said rack and adapted by its rotation to move the frame laterally with relation to the axle, and means for drawing the sliding member and the rack together to hold the frame against movement with relation to the axle, said rack member shaped to provide in itself a stop to limit its lateral movement with relation to the axle.

11. In combination with a vehicle frame an axle and means for moving the frame laterally bodily with relation to the axle including a sliding member upon said axle in combination with a rack member and a pinion mounted in said axle for rotation and in mesh with said rack and adapted by its rotation to move the frame laterally with relation to the axle, and means for drawing the rack and sliding member together to grip the axle to prevent relative movement of the parts, said rack member shaped to provide in itself a stop to limit its lateral movement with relation to the axle.

12. In combination with a vehicle frame an axle and means for moving the frame laterally bodily with relation to the axle including a sliding member upon said axle in combination with a rack member and a pinion mounted in said axle for rotation and in mesh with said rack and adapted by its rotation to move the frame laterally with relation to the axle, said rack member shaped at its ends so as to provide a stop to limit its lateral movement with relation to the axle.

13. In combination with a vehicle frame an axle and means for moving the frame laterally bodily with relation to the axle including a sliding member upon said axle in combination with a rack member and a pinion mounted in said axle for rotation and in mesh with said rack and adapted by its rotation to move the frame laterally with relation to the axle, and means for drawing the sliding member and the rack together to hold the frame against movement with relation to the axle, said rack member shaped so as to provide a stop to limit its lateral movement with relation to the axle.

14. In combination with a vehicle frame, an axle, and means for moving the frame laterally bodily with relation to the axle including a sliding member upon said axle in combination with a rack member and a pinion mounted in said axle for rotation and in mesh with said rack and adapted by its rotation to move the frame laterally with relation to the axle, and means for drawing the rack and sliding member together to grip the axle to prevent relative movement of the parts, said rack member shaped so as to provide a stop to limit its lateral movement with relation to the axle.

15. In combination with a vehicle frame, an axle and means for moving said frame bodily with respect to said axle, said means including a sliding member resting upon said axle and attached to said frame, and in combination with said sliding member a rack joined thereto and adapted to move therewith, a pinion mounted for rotation on said axle and adapted to mesh with said rack and by its rotation to move said rack and said frame.

Signed at Laporte, county of Laporte, and State of Indiana, this 11th day of April, 1922.

JAMES ROSS.